(12) United States Patent
Pramod et al.

(10) Patent No.: US 10,333,445 B2
(45) Date of Patent: Jun. 25, 2019

(54) TORQUE RIPPLE COMPENSATION WITH FEEDFORWARD CONTROL IN MOTOR CONTROL SYSTEMS

(71) Applicant: STEERING SOLUTIONS IP HOLDING CORPORATION, Saginaw, MI (US)

(72) Inventors: Prerit Pramod, Saginaw, MI (US); Infane Lowe, Flint, MI (US); Krishna MPK Namburi, Saginaw, MI (US); Varsha Govindu, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/820,579

(22) Filed: Nov. 22, 2017

(65) Prior Publication Data

US 2019/0158004 A1    May 23, 2019

(51) Int. Cl.
| | | |
|---|---|---|
| *H02P 21/00* | (2016.01) | |
| *H02P 21/05* | (2006.01) | |
| *H02P 21/14* | (2016.01) | |
| *H02P 25/03* | (2016.01) | |
| *B62D 6/00* | (2006.01) | |
| *B62D 5/04* | (2006.01) | |
| *H02P 21/22* | (2016.01) | |

(52) U.S. Cl.
CPC ............ *H02P 21/05* (2013.01); *B62D 5/0421* (2013.01); *B62D 6/00* (2013.01); *H02P 21/0003* (2013.01); *H02P 21/14* (2013.01); *H02P 21/22* (2016.02); *H02P 25/03* (2016.02)

(58) Field of Classification Search
CPC ................................. H02P 21/05; H02P 21/22
USPC ........................................ 318/400.02, 400.23
See application file for complete search history.

(56) References Cited

U.S. PATENT DOCUMENTS

| | | | | |
|---|---|---|---|---|
| 2009/0009127 A1* | 1/2009 | Imamura | .............. | G05B 13/025 318/601 |
| 2009/0237014 A1* | 9/2009 | Yamada | .................. | H02P 21/16 318/400.02 |
| 2011/0248656 A1* | 10/2011 | Yabuguchi | .............. | H02P 21/06 318/400.02 |
| 2012/0001576 A1* | 1/2012 | Iwadate | ................. | B41J 19/202 318/400.23 |
| 2017/0077854 A1* | 3/2017 | Son | ........................... | H02P 6/10 |

* cited by examiner

*Primary Examiner* — Erick D Glass
(74) *Attorney, Agent, or Firm* — Cantor Colburn LLP

(57) ABSTRACT

Technical solutions are described for providing torque ripple compensation when a motor control system is operating in feedforward mode. An example motor control system includes a feedforward controller that receives a first current command corresponding to an input torque command, and receives a second current command corresponding to a torque ripple. The feedforward controller generates a voltage command based on the first current command and the second current command, the voltage command being applied to a motor.

14 Claims, 7 Drawing Sheets

TORQUE RIPPLE COMPENSATION WITH FEEDFORWARD CONTROL IN MOTOR CONTROL SYSTEMS

BACKGROUND

The present application generally relates to motor control systems, and particularly addresses technical challenges regarding torque ripple compensation when operating motor control systems using feedforward control.

Industrial applications requiring low cost and high control performance typically employ complex electric drive in motion control systems, where the complexity is introduced in various components such as a power converter and an electric machine, to optimize cost. Generally, such optimization of cost leads to noise, vibration, and harshness (NVH) characteristics of the electrical machines to change, and at times exceed desirable threshold levels.

Typically, electrical machines using permanent magnet synchronous machines (PMSM), which may be operated using feedforward control, produce order tracked torque ripple (including cogging torque) due to non-sinusoidal back-EMF (BEMF) distribution of magnet flux around one or more air gaps in the PMSM. Further, imbalances between three (or more) phases of power used to operate the PMSM result in torque ripple as well. Further, several other machine-specific non-idealities result in torque ripple. Additionally, controlled induced parasitic torques also exist in the drive system of the PMSM.

Such torque ripples further cause the NVH characteristics of the PMSM to degrade. The NVH performance exceeding desirable threshold levels can cause discomfort to operators, for example if the PMSM is part of a steering system, a vehicle, home appliances, or any other system, and even make the system inoperable. Further, NVH can lead to structural damage to the system and/or surroundings. Accordingly, it is desirable to improve the NVH performance of the system.

SUMMARY

Technical solutions are described for providing torque ripple compensation when a motor control system is operating in feedforward mode. An example motor control system includes a feedforward controller that receives a first current command corresponding to an input torque command, and receives a second current command corresponding to a torque ripple. The feedforward controller generates a voltage command based on the first current command and the second current command, the voltage command being applied to a motor.

According to one or more embodiments, an example method for torque ripple compensation of a motor control system when operating in feedforward mode includes receiving, by a feedforward controller, a first current command corresponding to an input torque command. The method further includes receiving, by the feedforward controller, a second current command corresponding to a torque ripple. The method further includes generating, by the feedforward controller, a voltage command based on the first current command and the second current command, the voltage command being applied to a motor.

According to one or more embodiments an example power steering system includes a motor, and a motor control system that operates the motor in feedforward mode. The operating includes receiving a first current command corresponding to an input torque command, and further receiving a second current command corresponding to a torque ripple in a circuit of the motor. The motor control system generates a voltage command based on the first current command and the second current command, the voltage command being applied to the motor to cause displacement.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
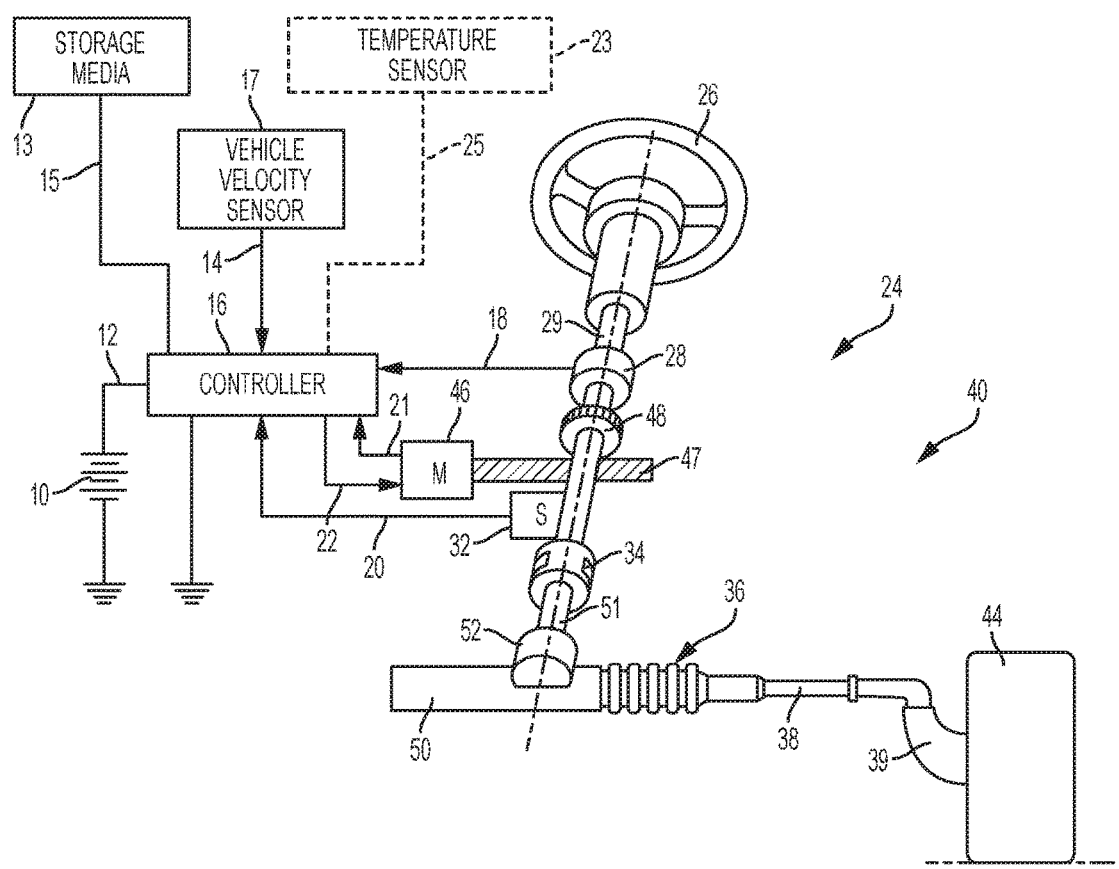
FIG. 1 is an exemplary embodiment of an electric power steering system.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 46, which could be a permanent magnet synchronous motor (PMSM), and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

A technical challenge exists with PMSM based electrical machines such as the EPS 40, because these machines produce order tracked torque ripple (including cogging torque) due to the non-sinusoidal back-EMF (BEMF) distribution of the magnet flux around the air gap. Further, imbalances between three phases of power result in torque ripple as well. Additionally, several other machine-specific non-idealities result in torque ripple. Further yet, controlled induced parasitic torques may also exist in the drive system. As described earlier, such torque ripples result in NVH issues, by degrading the NVH characteristics of the motor control system beyond predetermined threshold values. Thus, a technical challenge exists to improve the NVH performance.

In one or more examples, the minimization may be passive where the machine design itself keeps the non-idealities low. Alternatively, active control algorithms which compensate for the torque ripple may be employed. Typically, such techniques have been developed and employed in machines where feedback control is employed by the controller 16 to perform current control of PMSM 46, because feedback control provides current tracking, disturbance rejection, and tunability at desired levels.

The technical solutions described herein address the technical challenges regarding improving the NVH performance when the controller 16 uses feedforward control for current control of the PMSM 46. Feedforward control is an alternative technique that may be used, for example to reduce deployment costs, as feedforward control does not use current sensors. The technical solutions described herein use active torque ripple compensation via current injection for motor control systems utilizing feedforward control.

Figure 2:
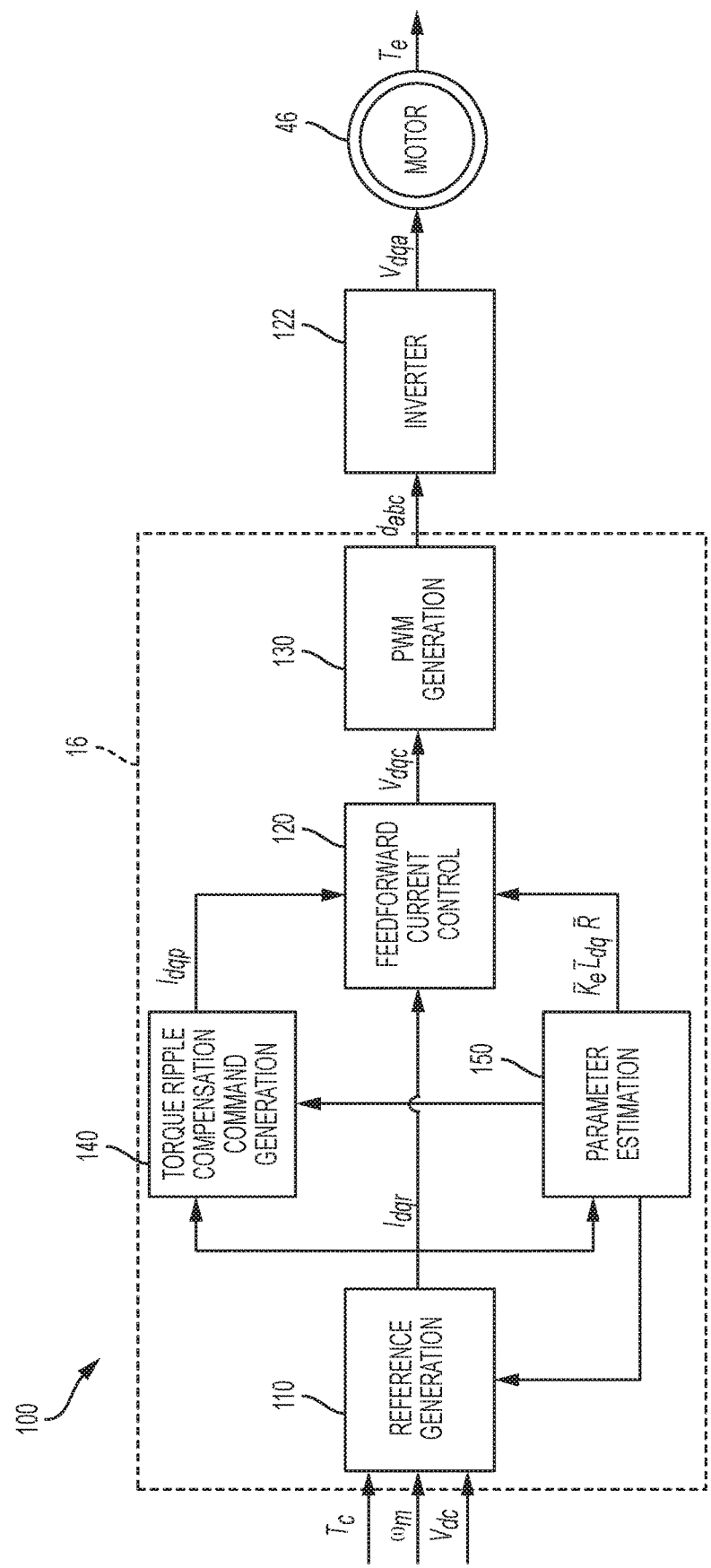
FIG. 2 depicts a block diagram of a motor control system using feedforward control with torque ripple compensation capability according to one or more embodiments.

FIG. 2 depicts a block diagram of a motor control system using feedforward control and provides torque ripple compensation according to one or more embodiments. The depicted motor control system 100 may be part of the steering system 40, or any other machine that uses a motor to cause displacement, generation of torque, and the like. In one or more examples, the inverter 122 is connected to the motor 46. In some embodiments, the motor 46 is a polyphase, permanent magnet synchronous motor (PMSM). In the examples described herein, the motor 46 is considered a three-phase PMSM, however it should be noted that in other examples, the motor 46 may be a poly-phase motor. The control module 16 is connected to the motor 46 through the inverter 122.

The control module 16 receives a motor torque command $T_c$ from a torque control system such as, for example, a steering control system. The control module 16 includes control logic for sending a motor voltage command $V_{dqc}$ to the motor 19 through the PWM generator 130 and the inverter 122. The voltage command includes a direct axis (d-axis) component, and a quadrature axis (q-axis) component.

The control module 16 includes a reference generation module 110 that generates a current command for the input torque command $T_c$ based on one or more signals such as a motor velocity $\omega_m$ and DC link voltage $V_{dc}$ that determine the operating condition of the electric drive system. The reference generation module determines a reference current ($I_{dqr}$) to use for PMSM control based on the input parameters.

The reference current command ($I_{dqr}$) in the d/q axes is sent to a feedforward current controller 120, which implements current control scheme for the controller 16. The feedforward current controller 120 converts the current command ($I_{dqr}$) into the voltage command ($V_{dqc}$), which is then applied to the motor 46 via a PWM generator 130 and the inverter 122. The PWM generator 130 takes the desired duty cycles or on-times for each of the switches of the inverter and creates and applies appropriate gate signals for driving the switches.

The controller 16 further includes a torque ripple compensation module 140 that generates and sends a torque ripple compensation command ($I_{dqp}$) to inject additional pulsating current signals in the d/q axis. The feedforward current controller 120 receives the pulsating current signals corresponding to torque ripple compensation command ($I_{dqp}$) and adds the pulsating current signals to the base current command ($I_{dqr}$).

Figure 3:
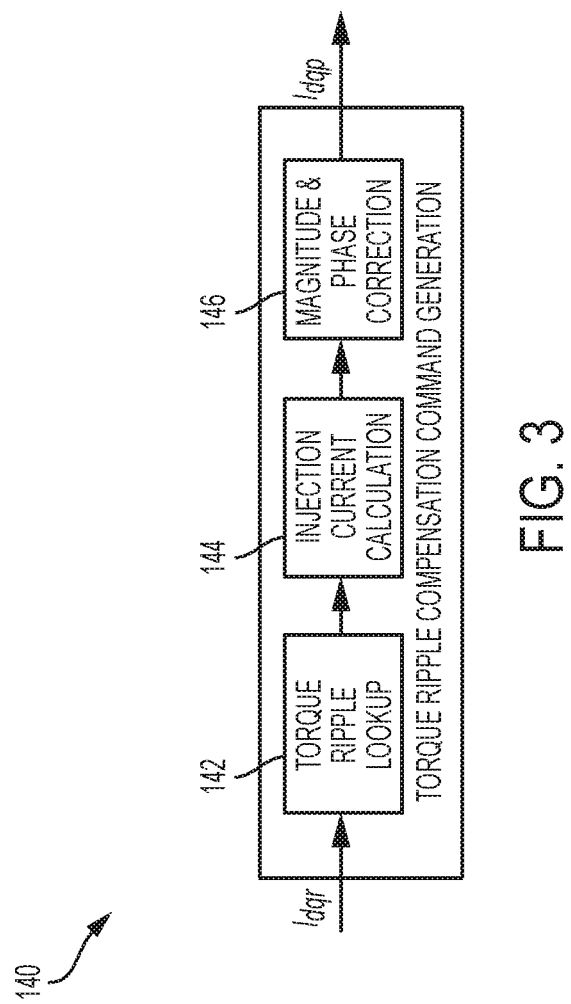
FIG. 3 depicts a block diagram of an example torque ripple compensation module according to one or more embodiments.

FIG. 3 depicts a block diagram of an example torque ripple compensation module according to one or more embodiments. The torque ripple compensation module includes, among other components, a torque ripple lookup 142, an injection current calculation 144, and a magnitude and phase correction 146.

The torque ripple (including cogging) of the machine, such as PMSM 46 in EPS 40, is determined offline, for example, by running constant low-speed tests at constant current or torque levels and recording the torque data. The torque data is decomposed into harmonic orders that are further compensated. The data for torque ripple that is to be compensated is first determined offline and then loaded into lookup tables for each order in the controller 16. The torque ripple lookup 142 facilitates accessing the lookup tables, and providing a torque ripple value from the lookup tables corresponding to the current command ($I_{dqr}$). Thereafter, the injection current calculation 144 uses a machine model, that is preconfigured, of the machine using the PMSM 46 to compute optimal d and/or q axis current commands. In one or more examples, the calculation is performed online, i.e. dynamically during runtime of the machine. Alternatively, in one or more examples, the calculation is performed offline, and corresponding d/q axis values for the torque ripple value determined are stored in another lookup table(s), accessible via the torque ripple lookup 142. The d/q axis current values are computed using the machine model such that when supplied to the PMSM 46 produce a pulsating torque that cancels out the actual torque ripple of the machine.

Further, the magnitude and phase correction 146 compensates for additional effects, such as speed dependent variation of the machine torque ripple, limitations of current controller bandwidth etc. This compensation is done through variation of the magnitude and phase of the pulsating current as a function of the operating conditions that are input to the control module 16, including machine speed ($\omega_m$), torque command ($T_c$), and currents.

The machine model used for such computations may be a mathematical model of the PMSM 46, such as follows:

$$V_d = L_d \frac{dI_d}{dt} + RI_d + \frac{N_p}{2}\omega_m L_q I_q$$

$$V_q = L_q \frac{dI_q}{dt} + RI_q - \frac{N_p}{2}\omega_m L_d I_d + K_e \omega_m$$

$$T_e = \frac{3}{2}K_e I_q + \frac{3}{4}N_p(L_q - L_d)I_d I_q$$

Here $V_d$, $V_q$ are the d/q motor voltages (in Volts), $I_d$, $I_q$ are the d/q motor currents (in Amperes), $L_d$, $L_q$ are the d/q axis motor inductances (in Henries), R is the motor circuit (motor plus controller) resistance (in Ohms), $K_e$ is the motor BEMF coefficient (in Volts/rad/s), $\omega_m$ is the mechanical motor velocity in (in rad/s), and $T_e$ is the electromagnetic motor torque (in Nm). Motor parameters vary (substantially) during operation. In one or more examples, there may be over 100% variation in R, and 5-20% variation in inductances $L_d$, $L_q$, and 15-20% in $K_e$. For example, R varies with build and temperature, $L_q$, $L_d$ vary due to saturation (i.e., as a function of $I_q$ and $I_d$), and $K_e$ varies due to saturation (as a function of $I_q$) and with temperature. It should be noted that the torque equation is nonlinear and represents sum of the torque developed by leveraging the magnetic field from the permanent magnets, and the reluctance torque generated by rotor saliency (difference between $L_d$ and $L_q$) and predetermined values of $I_q$ and $I_d$.

The machine model in the frequency domain may be written as follows.

$$V_d = (L_d s + R)I_d + \omega_e L_q I_q$$

$$V_q = (L_q s + R)I_q - \omega_e L_d I_d + K_e \omega_m$$

The above model represents a typical PMSM machine, and does not describe the pulsating components. The motor electrical velocity $\omega_e$ is equal to the pole pairs $$\frac{N_p}{2}$$

times the motor mechanical velocity $\omega_m$.

Referring back to FIG. 2, the controller 16 further includes a parameter estimation module 150 that estimates the values for $L_{dqc}$, R, and $K_e$ that are used in the mathematical model of the machine.

The feedforward controller 120 uses the estimated machine parameters to determine voltage commands for a set of given current commands $I_{dr}$ and $I_{qr}$. The voltage commands in feedforward control are given as follows.

$$V_{dr} = (\tilde{L}_d \tilde{s} + \tilde{R})I_{dr} + \tilde{\omega}_e \tilde{L}_q I_{qr}$$

$$V_{qr} = (\tilde{L}_q \tilde{s} + \tilde{R})I_{qr} - \tilde{\omega}_e \tilde{L}_d I_{dr} + \tilde{K}_e \tilde{\omega}_m$$

Here the accent implies that the parameters and signals are estimated in the controller, $V_{dqr}$ are the commanded voltages and $I_{dqr}$ are the current commands. In one or more examples, the parameters are estimated dynamically within the controller 16 considering both temperature and magnetic saturation effects. If the estimation is accurate, the actual currents track the measured currents. It should be noted that the derivative terms $\tilde{s}$ is also an approximation of the true derivative. An example of the derivative term in continuous time is as follows.

$$\tilde{s} = \frac{s}{(\tau s + 1)}$$

In the above representation of the derivative, s is the pure derivative term and $$\frac{1}{\tau s + 1}$$

represents a low pass filter. Using a low pass filter in combination with the pure derivative aids in modifying the undesirable high frequency response of the pure derivative term. (It is noted that the notification $\tilde{s}*I_d$ command indicates differentiation of the $I_d$ command).

If $\tau$ is set to a predetermined value, the derivative may be accurately estimated. The continuous time derivative may be implemented in discrete time (z domain), for example, by using Tustin approximation (or other techniques) as follows.

$$s = \frac{2}{T_s} \frac{1 - z^{-1}}{1 + z^{-1}}$$

Here $T_s$ is the discrete control loop sampling time. It should be noted that the approximate derivative may be implemented in other ways, including by changing the continuous time approximation, by using different discrete time approximations of the continuous time equivalents, or by directly designing the derivative term in the discrete domain.

In one or more examples, the machine model includes harmonic components which is not part of the model represented above. These harmonic components show up both in the voltage and torque equations, and the technical solutions described herein may be used with such models as well.

As described earlier, the technical solutions described herein perform torque ripple compensation by injecting additional pulsating current commands which produce pulsating torque that are out of phase with the actual torque ripple of the machine. The actual torque of the PMSM 46 including torque ripple may be:

$$T_e = \frac{3}{2} K_e I_q + \frac{3}{2} \frac{N_P}{2} (L_q - L_d) I_d I_q + T_p$$

where $T_p$ is the pulsating torque and is order tracked to the rotation of the PMSM 46, i.e., the frequencies of the pulsating torque components are integral multiples of the instantaneous motor velocity. This may be mathematically represented using a Fourier Series as follows.

$$T_p = \sum_{n=1}^{\infty} T_n(I_d, I_q) \sin(n\theta + \phi_n(I_d, I_q))$$

where n is the harmonic order, $\theta$ is the electrical position and $T_n$, $\phi_n$ are the magnitude and phase respectively of the torque ripple at that harmonic number.

Typically, both $T_n$ and $\phi_n$ are functions of the actual currents $I_{dq}$ of the PMSM 46. Therefore, in order to compensate the torque ripple, one way of computing the pulsating current $I_{qp}$ to be injected is as follows $$I_{qp} = \frac{-T_p}{\frac{3}{2}K_e + \frac{3}{2}\frac{N_P}{2}(L_q - L_d)I_d}$$

$$= -\sum_{n=1}^{\infty} \frac{T_n(I_d, I_q)}{\frac{3}{2}K_e + \frac{3}{2}\frac{N_P}{2}(L_q - L_d)I_d} \sin(n\theta + \phi_n(I_d, I_q))$$

In one or more examples, only the pulsating q-axis current component is injected, while d-axis current component is kept constant. Further, the final q-axis current command becomes the sum of $I_{qr}$ and $I_{qp}$, which is sent to the feedforward current controller 120 as input. As depicted in the above notation, the pulsating current $I_{qp}$ is a summation of all the harmonic orders of the torque ripple being compensated.

Alternatively, in one or more examples, pulsating components in both, the d and the q axis currents may be injected to compensate the torque ripple. The feedforward current controller 120 receives the $I_{qp}$ and/or the $I_{dp}$ components to produce the appropriate currents that compensate the torque ripple of the machine.

Figure 4:
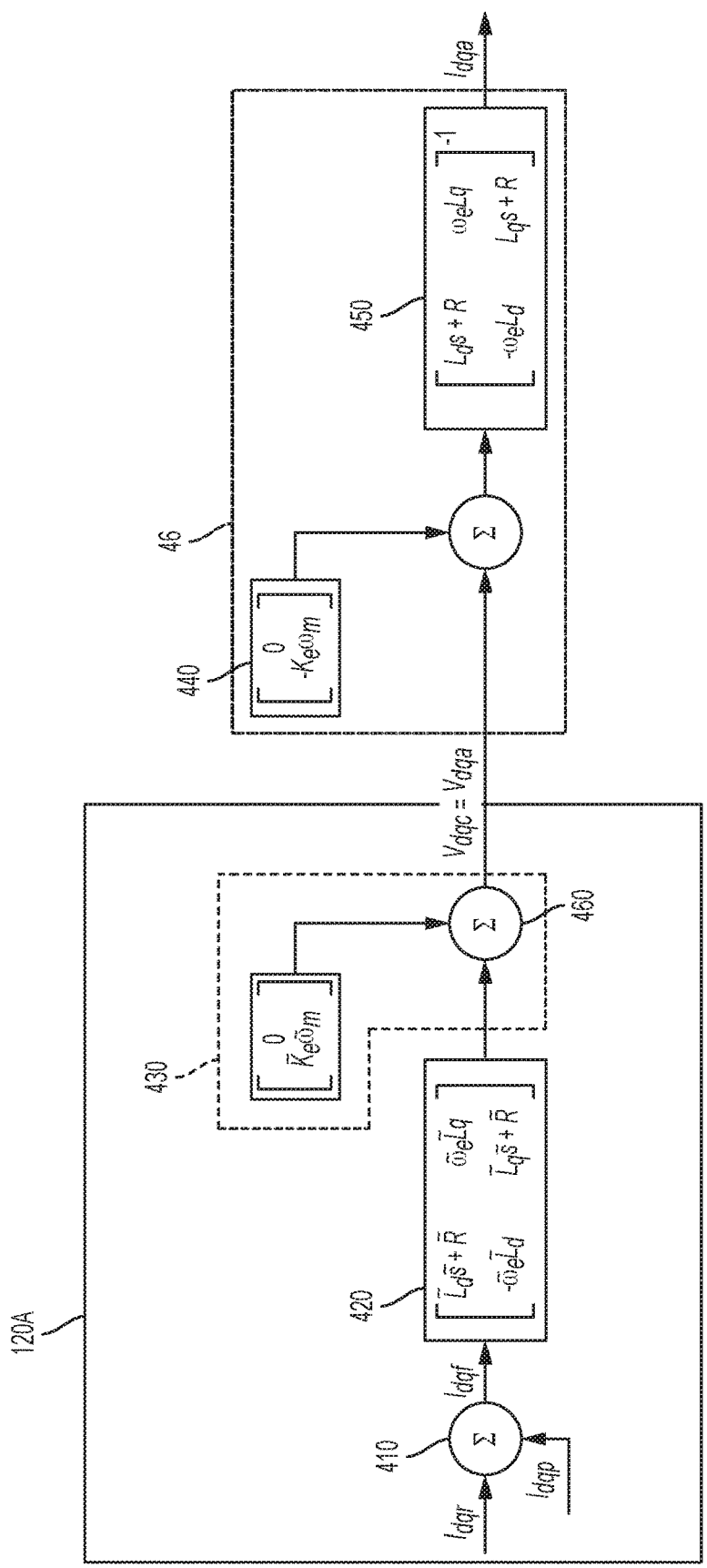
FIG. 4 depicts an example data flow of an example feedforward current controller implementing torque ripple compensation according to one or more embodiments.

FIG. 4 depicts an example data flow of an example feedforward current controller implementing torque ripple compensation according to one or more embodiments. The feedforward current controller 120A depicted in FIG. 4 implements torque ripple compensation by obtaining the compensation current command ($I_{dqp}$) that includes the pulsating current components and implements the dynamic feedforward compensation using a derivative term approximation.

As shown, the torque ripple compensation includes adding the current command ($I_{dqr}$) from the reference generation module 110 and the compensation current command ($I_{dqp}$) from the torque ripple compensation module 140, at 410. The resulting current command ($I_{dqf}$) is thus computed as $$I_{dqf} = I_{dqr} + I_{dqp}$$

Here, $I_{dqp} = a_{dqn} \sin(n\theta + \phi_{dqn})$ for the case where only a single order n is being compensated. However, in case of multi-order n the pulsating currents contain multiple harmonic orders that are compensated, which may be mathematically represented as $$I_{dpq} = \sum_{n=1}^{\infty} a_{dqn} \sin(n\theta + \phi_{dqn})$$

Thus, multiple harmonic orders are compensated simultaneously using the technical solutions described herein. Further, the feedforward voltage commands using the total current commands ($I_{dqf}$) are computed as follows, at 420 and 430.

$$V_{df} = (\tilde{L}_d \tilde{s} + \tilde{R}) I_{df} + \tilde{\omega}_e \tilde{L}_q I_{qf}$$

$$V_{qf} = (\tilde{L}_q \tilde{s} + \tilde{R}) I_{qf} - \tilde{\omega}_e \tilde{L}_d I_{df} + \tilde{K}_e \tilde{\omega}_m$$

The resulting voltage command $V_{dqc}$ (that includes the $V_{df}$ and $V_{dq}$ components) is then forwarded to the PMSM motor 46. The computations (shown at 420 and 430) compensate for the BEMF and the torque ripple that may be generated during the operation of the motor 46, as depicted at 440 and 450 respectively.

In one or more examples, a time-constant below a predetermined threshold is used for the low pass filter to optimize the derivative term ($\tilde{s}$) of the pulsating component used for the computation. However, if the time-constant is increased above the predetermined threshold, high frequency noise may be passed through the current commands to the output leading to suboptimal NVH performance of the system 100. To address such a technical challenge, the technical solutions described herein make the time-constant of the low-pass filter adaptive by scheduling the time constant as a function of motor electrical velocity $\omega_e$ as follows.

$$\tau(\omega_e) = \begin{cases} \dfrac{1}{mn_{max}\omega_{emin}}, & \omega_e < \omega_{emin} \\ \dfrac{1}{mn_{max}\omega_e}, & \omega_e \geq \omega_{emin} \end{cases}$$

Here $\omega_{emin}$ is a first electrical velocity threshold above which the time-constant is varied with the motor velocity, m is a tunable scale factor and $n_{max}$ is the highest harmonic order being compensated. It should be noted that the above is one example, and that in other embodiments other scheduling functions may be used to optimize the NVH performance and torque ripple compensation performance. Alternatively, or in addition, the adaptive techniques can vary depending on the type of derivative approximation being used.

The feedforward voltage components computed by the filter module 420 and a component based on the BEMF (430) are added to determine a final feedforward voltage command $V_{dqc}$, at 460. The final feedforward voltage command is applied across the motor 46 to generate the desired torque and to compensate for the BEMF as well as the torque ripple pulsations.

Figure 5:
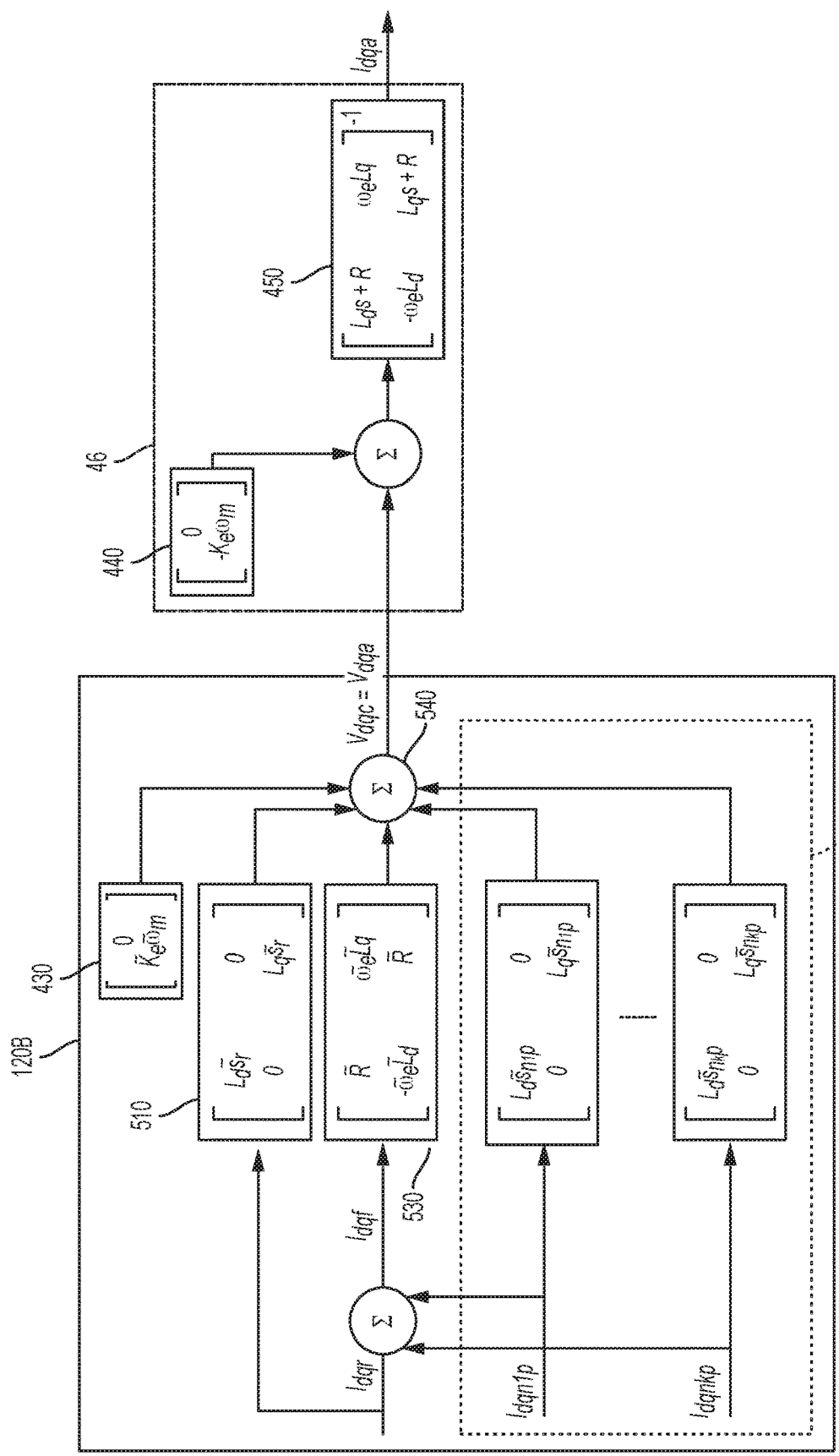
FIG. 5 depicts an example data flow of an example feedforward current controller implementing torque ripple compensation according to one or more embodiments.

FIG. 5 depicts an example data flow of an example feedforward current controller implementing torque ripple compensation according to one or more embodiments. The feedforward current controller 120B depicted in FIG. 5 implements torque ripple compensation by separating the derivative terms for the constant and pulsating components. The current command ($I_{dqf}$) is again computed, at 510, as $$I_{dqf} = I_{dqr} + I_{dqp}$$

Further, a derivative term $\tilde{s}_r$ for the constant component is determined using $I_{dqr}$, at 510. In addition, separate derivative terms of the pulsating components in $I_{dqp}$ are determined, $s_{n_1p}, \ldots, s_{n_kp}$, corresponding to each component $I_{dqn1p}, I_{dqn2p}, \ldots, I_{dqnnp}$, at 520. The derivative terms for each order are made adaptive using one or more filters, and the cutoff frequencies of these filters are calculated based on the frequency $n\omega_e$ of the specific pulsating component being compensated, at 520. For example, FIG. 5 shows a case where a total of k orders are being compensated, and the values of the orders are $n_1, n_2, \ldots, n_k$. The derivation of an adaptive filter, in an example, is described further.

It should be noted that the derivative terms (s) determined for the d-axis ($s_d$) and the q-axis ($s_q$) may be different in one or more examples, however, for simplicity of illustration and explanation, the examples described herein assume the same derivative (s) terms for the two axes. For example, in case of distinct derivative terms for each axis, the derivative terms of the pulsating components may be $s_{dn_1p}, \ldots, s_{dn_kp}$ for the d-axis and $s_{qn_1p}, \ldots, s_{qn_kp}$ for the q-axis.

The base filter is chosen as follows.

$$H(s) = \frac{as^2}{(\tau s + 1)^2}$$

In order for this filter to be a derivative filter at the frequency of interest $n\omega_e$ the following conditions for magnitude and phase are checked to confirm that $s = jn\omega_e$.

$$|H(s)| = |s|$$

$$\angle H(s) = \frac{\pi}{2}$$

These conditions being true ensures that the filter is a pure derivative at the frequency of interest. By applying the above conditions, the values for a and τ are determined as follows.

$$a = \frac{2}{n\omega_e}$$

$$\tau = \frac{1}{n\omega_e}$$

With the aforementioned parameters, the adaptive filter may be represented as follows.

$$H(s) = \frac{2n\omega_e s^2}{(s + n\omega_e)^2}$$

Figure 6:
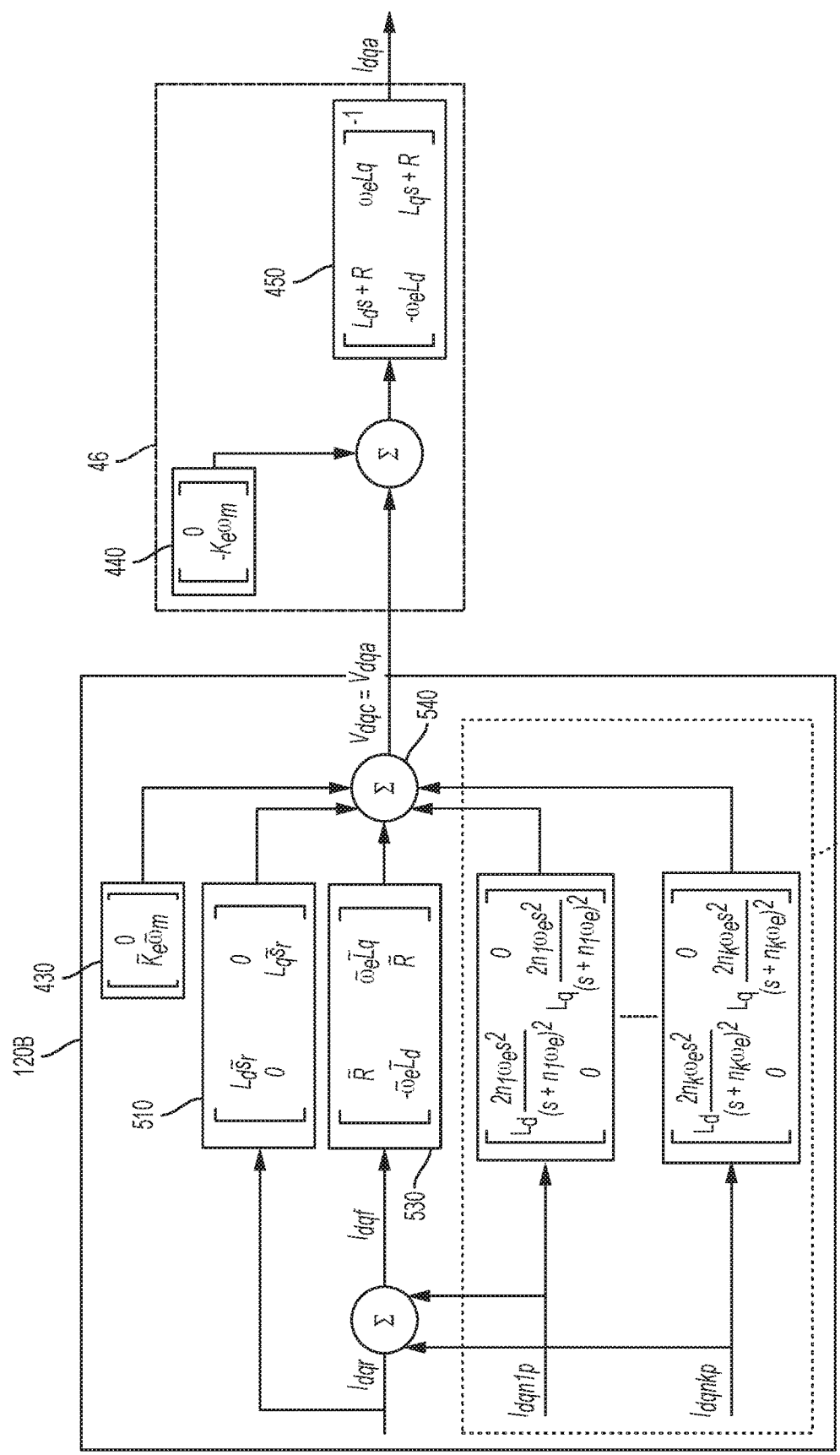
FIG. 6 depicts an example data flow of an example feedforward current controller implementing torque ripple compensation according to one or more embodiments.

FIG. 6 depicts an example feedforward controller 120B using the adaptive filter determined above according to one or more embodiments. It should be noted that the adaptive filter shown above is only an example, and other continuous time filters may be used in other implementations. Further, in order to implement the filter in discrete time, the adaptive filter may be discretized using various discretization techniques, such as the bilinear with pre-warping method with the critical frequency of the specific harmonic order being compensated. The equation for converting the filter from the continuous time domain (or s-domain) into the discrete time (or z-domain) for the bilinear with pre-warping technique is as follows.

$$s = \frac{n\tilde{\omega}_e}{\tan\left(\frac{n\tilde{\omega}_e T_s}{2}\right)} \frac{1 - z^{-1}}{1 + z^{-1}}$$

where n is the harmonic electrical order, $T_s$ is the sampling time of the control loop and $\tilde{\omega}_e$ is the estimated electrical velocity. In other examples, other transformation techniques such as the Tustin transform may also be used to convert continuous time designs into discrete time. Further, direct design of discrete time filters may also be performed for realizing the adaptive filter.

Further yet, referring to FIG. 5 and FIG. 6, the feedforward controller 120B further computes a feedforward voltage command component using the total current commands ($I_{dqf}$) based on the R, L, and $\omega_e$, among others, at 530.

The feedforward voltage components computed from the multiple filter modules 510, 520, 530, and further a component based on the BEMF (430) are added to determine a final feedforward voltage command $V_{dqc}$, at 540. The final feedforward voltage command is applied across the motor 46 to compensate for the BEMF as well as the torque ripple pulsations and to generate the commanded torque.

Figure 7:
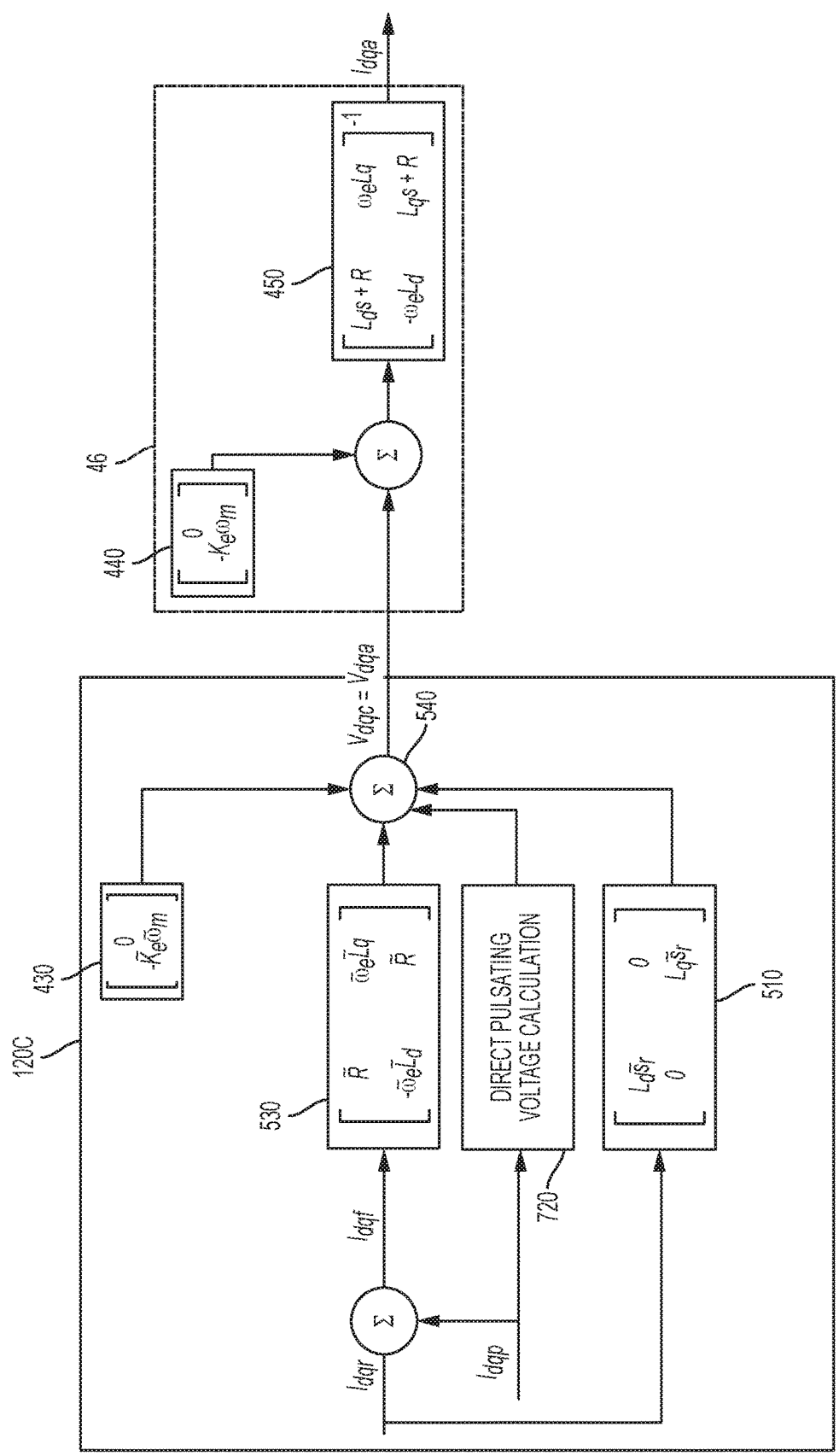
FIG. 7 depicts an example data flow of an example feedforward current controller implementing torque ripple compensation according to one or more embodiments.

FIG. 7 depicts an example data flow of an example feedforward current controller implementing torque ripple compensation according to one or more embodiments. The feedforward current controller 120C depicted in FIG. 7 implements torque ripple compensation by pre-computing the pulsating voltage commands from the current commands using estimated parameters, and directly injecting the voltage commands.

In one or more examples, the pulsating voltages $V_{dqnp}$ for each of the n harmonic orders are computed, at 720. For example, the pulsating current commands $I_{dnp}$ and $I_{qnp}$ for a single order n case may be expressed as follows.

$$I_{dnp} = a_{dn} \sin(n\theta + \phi_{dn})$$

$$I_{qnp} = a_{qn} \sin(n\theta + \phi_{qn})$$

Further, the pulsating voltage components may be computed by substituting the current command expressions in the machine voltage-current equations presented earlier. The resulting voltage equations are thus obtained as follows.

$$V_{dnp} = RI_{dnp} + \omega_e L_q I_{qnp} + L_d \dot{I}_{dnp} = b_{dn} \sin(n\theta + \psi_{dn})$$

$$V_{qnp} = RI_{qnp} - \omega_e L_d I_{dnp} + L_q \dot{I}_{qnp} = b_{qn} \sin(n\theta + \psi_{qn})$$

where $b_{qn}$, $b_{dn}$, $\psi_{qn}$, $\psi_{dn}$ are functions of machine parameters and pulsating current commands coefficients $a_{dn}$, $a_{qn}$, $\phi_{dn}$, $\phi_{qn}$.

The aforementioned equations apply compensation where both pulsating d and q axis currents are injected for compensation. In case only one of the pulsating components is injected, only the corresponding equations are used, i.e., the values of coefficients of the other current command are set to zero.

Further, the aforementioned description is for a single order (n=1), and in one or more examples, similar computations are performed for the other harmonic orders to extend the torque ripple compensation to multiple orders by using the principle of superposition which states that for a linear system, the net response at a given place and time caused by two or more stimuli is the sum of the responses which would have been caused by each stimulus individually. Accordingly, in one or more examples, multiple modules similar to 720 shown in FIG. 7 are included in order to generate multiple pulsating current components.

In addition, the feedforward controller 120C computes voltage command components for $I_{dqr}$ and $I_{dqf}$ using the L and R terms, at 510 and 530, as described herein. The feedforward voltage components computed from the multiple filter modules 510, 720, 530, and further a component based on the BEMF (430) are added to determine a final feedforward voltage command $V_{dqc}$, at 540. The final feedforward voltage command is applied across the motor 46 to compensate for the torque ripple pulsations.

It should be noted that other effects such as speed dependent variation of torque ripple or limitations of controller bandwidth may also affect the effectiveness of the one or more embodiments described herein. Such effects may be compensated by adjusting the pulsating current component through magnitude and phase adjustments. For instance, the pulsating current commands may be computed (adjusted) as follows to compensate for controller bandwidth variation with load and speed.

$$I_{dqp} = m_{dqn} a_{dqn} \sin(n\theta + \phi_{dqn} + \alpha_{dqn})$$

Here $m_{dqn}$ and $\alpha_{dqn}$ are the magnitude and phase adjustment parameters that may be scheduled as functions of load (torque or currents) and speed.

The technical solutions described herein facilitate reducing torque ripple from a base value in a motor control system that is operating in feedforward control, without using current sensors. The technical solutions described herein can be used irrespective of how the pulsating current commands are generated.

In one or more examples, the torque ripple is compensated by a feedforward current controller by adjusting a reference by injecting a current command including pulsating components. In one or more examples, a sum of the reference command and the pulsating components is adjusted (120A).

Alternatively, in one or more examples, separate derivative approximations are performed for a base current command from a reference current generator in addition to approximation for the pulsating current commands (120B). For example, individual derivative terms for different harmonic orders are determined. The individual derivative terms for each order are adapted based on an adaptive time-constant. Further, technical solutions are described herein for improved derivative term estimation for the pulsating components.

Further yet, in one or more examples, the feedforward current controller determines voltage components corresponding to the pulsating components using computation based on trigonometric identities using pulsating current command coefficients (120C).

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A motor control system that provides torque ripple compensation when operating in feedforward mode, the motor control system comprising:
    a feedforward controller configured to:
        receive a first current command corresponding to an input torque command;
        receive a second current command corresponding to a torque ripple to be compensated; and
        generate a voltage command based on the first current command and the second current command, the voltage command being applied to a motor, wherein generating the voltage command comprises:
            determining a first voltage command using the first current command and further based on motor inductance, motor circuit resistance, and motor velocity;
            determining a second voltage command using the second current command, and further based on the motor inductance, the motor circuit resistance, and the motor velocity;
            determining a third voltage command corresponding to a back-emf of the motor; and
            adding the first voltage command, the second voltage command, and the third voltage command.

2. The motor control system of claim 1, wherein the second current command (Idqp) is for a single order torque ripple.

3. The motor control system of claim 1, wherein the second current command (Idqp) is for multi-ordered torque ripple, the voltage command compensating the multi-ordered torque ripple simultaneously.

4. A motor control system that provides torque ripple compensation when operating in feedforward mode, the motor control system comprising:
    a feedforward controller configured to:
        receive a first current command corresponding to an input torque command:
        receive a second current command corresponding to a torque ripple to be compensated; and
        generate a voltage command based on the first current command and the second current command, the voltage command being applied to a motor, wherein the voltage command (Vdqf) comprises a d-axis component (Vdf) and a q-axis component (Vqf), and generating the voltage command (Vdqf) comprises:

determining a final current command (Idqf) by adding the first current command (Idqr) and the second current command (Idqp), each containing q-axis and d-axis components;
determining the d-axis component (Vdf) of the voltage command using both the d-axis component of the final current command (Idf) and the q-axis component of the final current command (Iqf); and
determining the q-axis component (Vqf) of the voltage command using both the d-axis component of the final current command (Idf) and the q-axis component of the final current command (Iqf), and wherein the voltage command is computed as $$V_{df}=(\tilde{L}_d\tilde{s}+\tilde{R})I_{df}+\tilde{\omega}_e\tilde{L}_qI_{qf}$$

$$V_{qf}=(\tilde{L}_q\tilde{s}+\tilde{R})I_{qf}-\tilde{\omega}_e\tilde{L}_dI_{df}+\tilde{K}_e\tilde{\omega}_m,$$

where L represents inductance of the system, R represents resistance of the system, $\omega_e$ represents electrical motor velocity, $\omega_m$ represents motor velocity, $K_e$ represents a predetermined value, and s represents a derivative term.

5. A method for torque ripple compensation of a motor control system when operating in feedforward mode, the method comprising:
receiving, by a feedforward controller, a first current command corresponding to an input torque command;
receiving, by the feedforward controller, a second current command corresponding to a torque ripple to be compensated; and
generating, by the feedforward controller, a voltage command based on the first current command and the second current command, the voltage command being applied to a motor, wherein generating the voltage command comprises:
determining a first voltage command using the first current command and further based on motor inductance, motor circuit resistance, and motor velocity;
determining a second voltage command using the second current command, and further based on the motor inductance, the motor circuit resistance, and the motor velocity;
determining a third voltage command corresponding to a back-emf of the motor; and
adding the first voltage command, the second voltage command, and the third voltage command.

6. The method of claim 5, wherein the second current command (Idqp) is for a single order torque ripple.

7. The method of claim 5, wherein the second current command (Idqp) is for multi-ordered torque ripple, the voltage command compensating the multi-ordered torque ripple simultaneously.

8. A method for torque ripple compensation of a motor control system when operating in feedforward mode, the method comprising:
receiving, by a feedforward controller, a first current command corresponding to an input torque command;
receiving, by the feedforward controller, a second current command corresponding to a torque ripple to be compensated; and
generating, by the feedforward controller, a voltage command based on the first current command and the second current command, the voltage command being applied to a motor, wherein the voltage command (Vdqf) comprises a d-axis component (Vdf) and a q-axis component (Vqf), and generating the voltage command (Vdqf) comprises:

determining a final current command (Idqf) by adding the first current command (Idqr) and the second current command (Idqp), each containing q-axis and d-axis components;
determining the d-axis component (Vdf) of the voltage command using both the d-axis component of the final current command (Idf) and the q-axis component of the final current command (Iqf); and
determining the q-axis component (Vqf) of the voltage command using both the d-axis component of the final current command (Idf) and the q-axis component of the final current command (Iqf), wherein the voltage command is computed as $$V_{df}=(\tilde{L}_d\tilde{s}+\tilde{R})I_{df}+\tilde{\omega}_e\tilde{L}_qI_{qf}$$

$$V_{qf}=(\tilde{L}_q\tilde{s}+\tilde{R})I_{qf}-\tilde{\omega}_e\tilde{L}_dI_{df}+\tilde{K}_e\tilde{\omega}_m,$$

where L represents inductance of the system, R represents resistance of the system, $\omega_e$ represents electrical motor velocity, $\omega_m$ represents motor velocity, $K_e$ represents a predetermined value, and s represents a derivative term.

9. A power steering system comprising:
a motor; and
a motor control system configured to operate the motor in feedforward mode, the operating comprising:
receiving a first current command corresponding to an input torque command;
receiving a second current command corresponding to a torque ripple in a circuit of the motor, the torque ripple to be compensated; and
generating a voltage command based on the first current command and the second current command, the voltage command being applied to the motor to cause displacement, the voltage command (Vdgf) comprises a d-axis component (Vdf) and a q-axis component (Vgf), and the voltage command is computed as $$V_{df}=(\tilde{L}_d\tilde{s}+\tilde{R})I_{df}+\tilde{\omega}_e\tilde{L}_qI_{qf}$$

$$V_{qf}=(\tilde{L}_q\tilde{s}+\tilde{R})I_{qf}-\tilde{\omega}_e\tilde{L}_dI_{df}+\tilde{K}_e\tilde{\omega}_m,$$

where I represents current command, L represents inductance of the system, R represents resistance of the system, $\omega_e$ represents electrical motor velocity, $\omega_m$ represents motor velocity, $K_e$ represents a predetermined value, and s represents a derivative term.

10. The power steering system of claim 9, wherein generating the voltage command comprises:
determining a first voltage command using the first current command and further based on motor inductance, motor circuit resistance, and motor velocity;
determining a second voltage command using the second current command, and further based on the motor inductance, the motor circuit resistance, and the motor velocity; and
adding the first voltage command and the second voltage command.

11. The power steering system of claim 10, wherein generating the voltage command further comprises:
determining a third voltage command corresponding to a back-emf of the motor; and
adding first voltage command, the second voltage command, and the third voltage command.

12. The power steering system of claim 9, wherein generating the voltage command (Vdqf) further comprises:
determining a final current command (Idqf) by adding the first current command (Idqr) and the second current command (Idqp), each containing q-axis and d-axis components;

determining the d-axis component (Vdf) of the voltage command using both the d-axis component of the final current command (Idf) and the q-axis component of the final current command (Iqf); and determining the q-axis component (Vqf) of the voltage command using both the d-axis component of the final current command (Idf) and the q-axis component of the final current command (Iqf).

13. The power steering system of claim 9, wherein the second current command (Idqp) is for a single order torque ripple.

14. The power steering system of claim 9, wherein the second current command (Idqp) is for multi-ordered torque ripple, the voltage command compensating the multi-ordered torque ripple simultaneously.

* * * * *